(12) United States Patent
Boyd et al.

(10) Patent No.: US 11,948,126 B2
(45) Date of Patent: Apr. 2, 2024

(54) LASER DETECTION SYSTEM FOR IDENTIFYING ITEM INTERACTION

(71) Applicant: B.E.A. Inc., Pittsburgh, PA (US)

(72) Inventors: Jeffrey Boyd, Moon Township, PA (US); Christopher Rigatti, Pittsburgh, PA (US); Michael Brazier, Pittsburgh, PA (US)

(73) Assignee: B.E.A. INC., Pittsburgh, PA (US)

( * ) Notice: Subject to any disclaimer, the term of this patent is extended or adjusted under 35 U.S.C. 154(b) by 616 days.

(21) Appl. No.: 17/148,176

(22) Filed: Jan. 13, 2021

(65) Prior Publication Data

US 2021/0215826 A1 Jul. 15, 2021

Related U.S. Application Data

(60) Provisional application No. 62/960,371, filed on Jan. 13, 2020.

(51) Int. Cl.
*G06V 20/64* (2022.01)
*G01S 17/88* (2006.01)
(Continued)

(52) U.S. Cl.
CPC ............ *G06Q 10/087* (2013.01); *G01S 17/88* (2013.01); *G06V 10/143* (2022.01); *G06V 20/00* (2022.01); *G06V 20/64* (2022.01)

(58) Field of Classification Search
CPC ...... G06V 20/64; G06V 10/143; G06V 20/00; G01S 17/88
See application file for complete search history.

(56) References Cited

U.S. PATENT DOCUMENTS 10,048,060 B1 8/2018 Brazeau
10,268,983 B2 4/2019 Kumar et al.
(Continued)

FOREIGN PATENT DOCUMENTS

CN 107749114 A 3/2018
CN 208318835 U 1/2019
CN 209281527 U 8/2019

OTHER PUBLICATIONS

Kyota Higa and Kota Iwamoto, Robust shelf monitoring using supervised learning for improving on-shelf availability in retail stores (https://www.mdpi.com/1424-8220/19/12/2722/htm). published Jun. 17, 2019, 20 pages.
(Continued)

*Primary Examiner* — Sam Bhattacharya
(74) *Attorney, Agent, or Firm* — Dinsmore & Shohl LLP

(57) ABSTRACT

A laser detection system including at least one laser device projecting a light curtain, and a controller is provided. The controller includes a processor and non-transitory, processor-readable memory including executable instructions that, when executed by the processor, cause the controller to receive a signal from the at least one laser device, the signal including an interference point of an object with the light curtain, and distance data indicating a distance between the interference point and the at least one laser device, determine a location at which the object enters the light curtain based on the distance between the interference point and the at least one laser device, and identify an item of a plurality of items located in an area behind the light curtain and corresponding to the location at which the object enters the light curtain.

20 Claims, 5 Drawing Sheets

(51) Int. Cl.
*G06Q 10/087* (2023.01)
*G06V 10/143* (2022.01)
*G06V 20/00* (2022.01)

(56) References Cited

U.S. PATENT DOCUMENTS

| | | |
|---|---|---|
| 10,371,786 B1 | 8/2019 | Orlov et al. |
| 10,438,277 B1 | 10/2019 | Jiang et al. |
| 10,466,095 B1 | 11/2019 | O'Neill et al. |
| 2020/0143315 A1 | 5/2020 | Marquette |

OTHER PUBLICATIONS

International Search Report and Written Opinion for PCT/US21/13189 dated Apr. 5, 2021, 16 pages.

LASER DETECTION SYSTEM FOR IDENTIFYING ITEM INTERACTION

CROSS-REFERENCE TO RELATED APPLICATION

This application claims priority to U.S. Provisional Patent Application No. 62/960,371, filed Jan. 13, 2020, for "Laser Detection System For Identifying Item Interaction," which is hereby incorporated by reference in its entirety including the drawings.

TECHNICAL FIELD

The present specification generally relates to systems and methods for collecting data pertaining to an item and, more specifically, systems and methods for identifying user handling of an item on a shelving unit.

BACKGROUND

In the retail field, data pertaining to an identification of an item that is removed from a shelf such as, for example, how long an item is removed from the shelf and whether an item is placed back on the shelf after it is removed, is useful in determining marketability of items for inventory management and/or for other data collection or analysis purposes. For example, if it is determined that an item is not being removed from a shelf as often as expected, it may be necessary to move the item to a different location or remove the item altogether. In another example, if it determined that an item is regularly removed from a shelf and placed back after a short period of time, this may be indicative that something is wrong or undesirable about the item when closely examined by an individual who picked up the item. Retail systems for collecting the above data for individual items may be useful to increase product sales. In addition, data pertaining to objects placed on and/or removed from shelving units in industries and fields other than a retail environment such as, for example, a warehouse environment, or the like, may be useful as well to identify use of specific items.

SUMMARY

In one embodiment, a laser detection system includes at least one laser device projecting a light curtain, and a controller. The controller includes a processor and non-transitory, processor-readable memory including executable instructions that, when executed by the processor, cause the controller to receive a signal from the at least one laser device, the signal including an interference point of an object with the light curtain, and distance data indicating a distance between the interference point and the at least one laser device, determine a location at which the object enters the light curtain based on the distance between the interference point and the at least one laser device, and identify an item of a plurality of items located in an area behind the light curtain and corresponding to the location at which the object enters the light curtain.

In another embodiment, a shelving unit system includes a shelving unit having an interior, a plurality of items provided in the interior of the shelving unit, and a laser detection system. The laser detection system includes at least one laser device projecting a light curtain adjacent to at least a portion of the interior of the shelving unit and a controller. The controller includes a processor and non-transitory, processor-readable memory including executable instructions that, when executed by the processor, cause the controller to receive a signal from the at least one laser device, the signal including an interference point of an object with the light curtain, and distance data indicating a distance between the interference point and the at least one laser device, determine a location at which the object enters the light curtain based on the distance between the interference point and the at least one laser device, and identify an item of the plurality of items located in the interior of the shelving unit behind the light curtain and corresponding to the location at which the object enters the light curtain.

In yet another embodiment, a method of identifying user interaction with an item on a shelving unit, includes projecting a light curtain adjacent by at least one laser device across at least a portion of a shelving unit, receiving a signal from the at least one laser device, the signal including an interference point of an object with the light curtain, and distance data indicating a distance between the interference point and the at least one laser device, determining a location at which the object enters the light curtain based on the distance between the interference point and the at least one laser device, and identifying an item of a plurality of items located in an area behind the light curtain and corresponding to the location at which the object enters the light curtain.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein relate to systems and methods for identifying an item reached for by a person, for example, in a retail environment, a warehouse environment, or the like. The systems and methods of the present disclosure include at least one laser device for projecting a light curtain adjacent to a plurality of items. The laser device utilizes measurements such as time-of-flight calculations to identify when an object, such as a hand of a person, enters or crosses the light curtain toward an item behind the light curtain. Based on position information of a plurality of items behind the light curtain, the system determines which item was reached for by the person and determines whether the item was removed based on the difference in characteristics of the measurements when the person's hand is removed.

Conventional item identification methods and systems include one or more sensors and one or more cameras for identifying interaction with one of a plurality of items. In particular, the one or more sensors are arranged to project a sensing field in a plane extending across the plurality of items and identify when an object such as, for example, a user, reaches across the sensing field and toward one of the items. In response to the one or more sensors detecting the object crossing the sensing field, the one or more cameras capture image data to identify the particular location at which the user crosses the sensing field. This location information is useful for identifying an item with which the user may have interacted. However, these conventional methods and systems fail to utilize the one or more sensors themselves for identifying a specific location at which the object, i.e., the user, crosses the sensing field. Further, the systems and methods described herein eliminate the need for additional components (e.g., the camera), additional software (e.g., image recognition software), and/or the like. The elimination of such components may provide a space saving feature in that a camera does not need to be mounted away from the shelving or the like upon which items are held. In addition, the systems and methods described herein can more accurately determine an item and a location than conventional item identification methods and systems.

Systems and methods for identifying an item of a plurality of items behind a light curtain will now be described in more detail with reference to the drawings and where like numbers refer to like structures.

Figure 1:
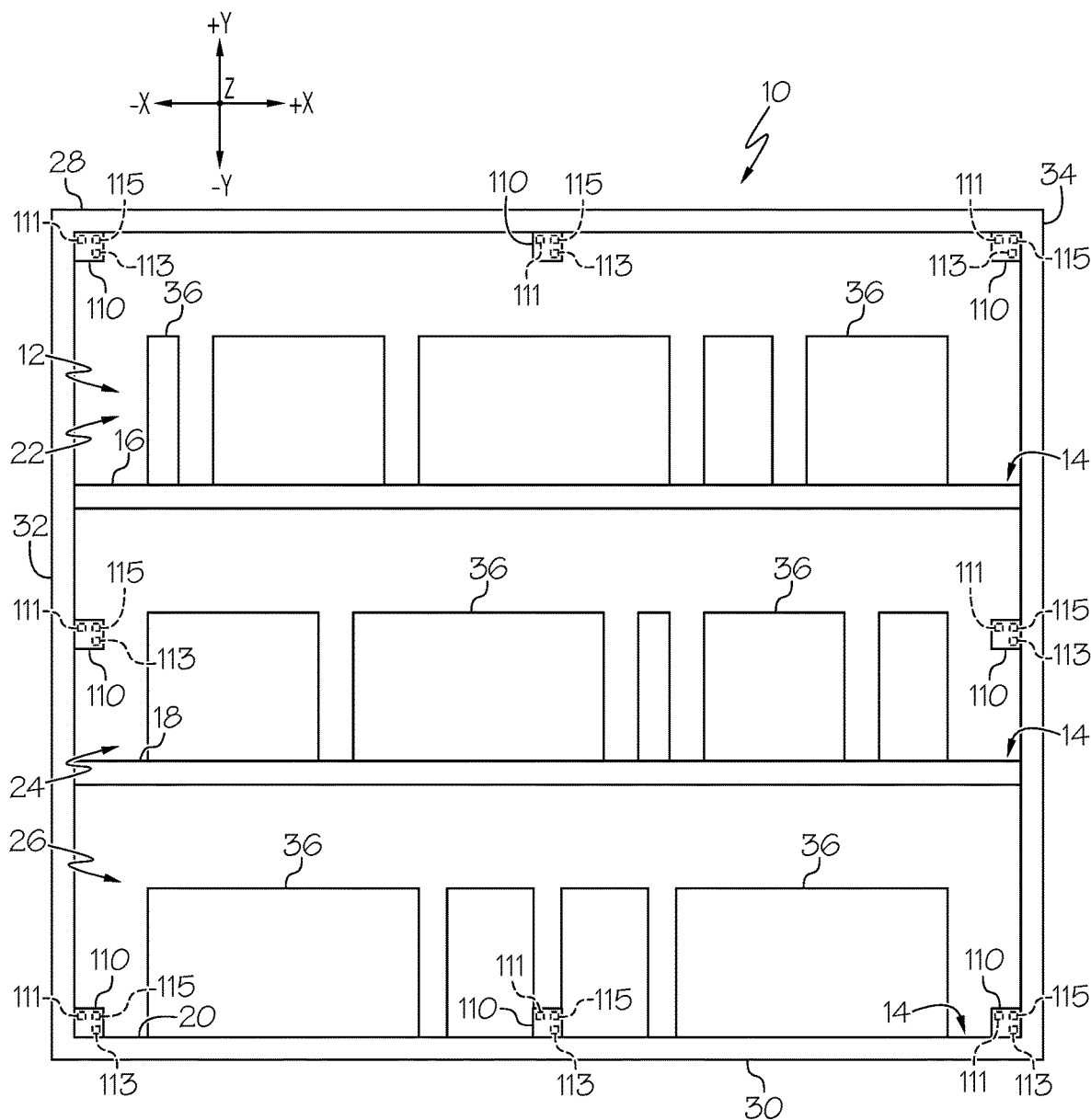
FIG. 1 schematically depicts a front view of an illustrative shelving unit including a plurality of items and a plurality of laser devices according to one or more embodiments shown and described herein.
Figure 2:
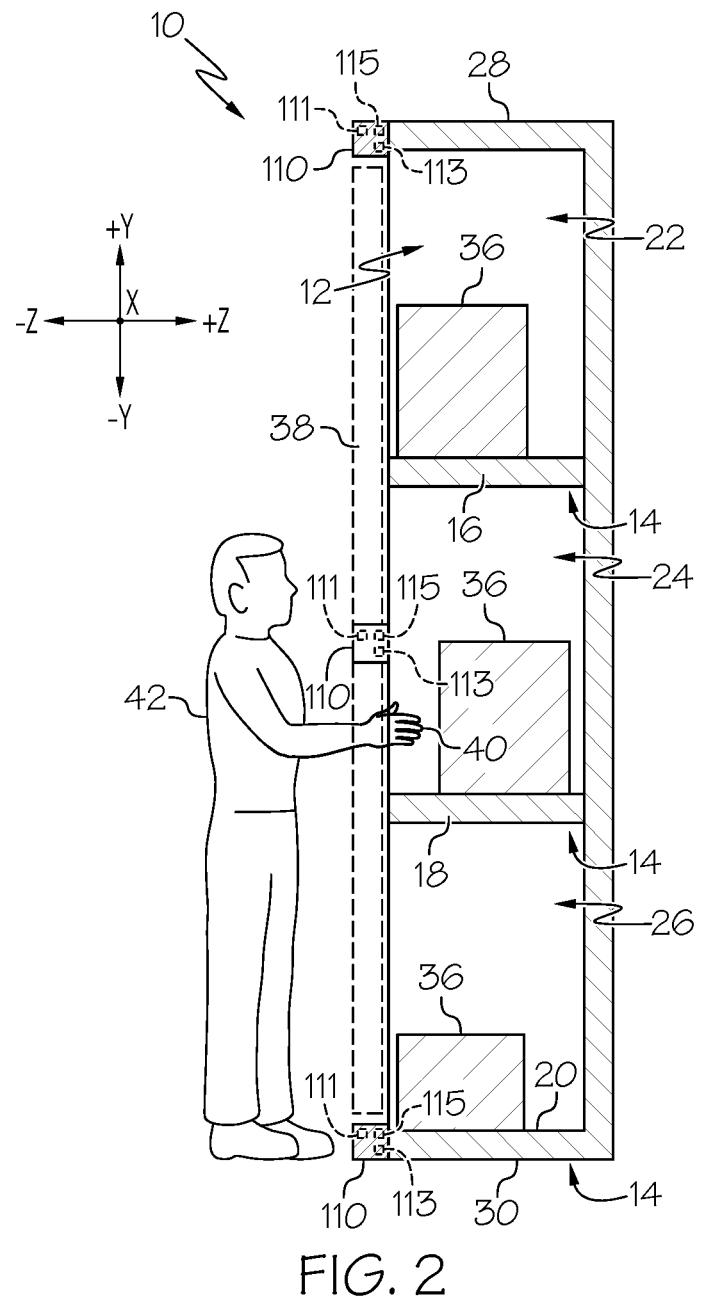
FIG. 2 schematically depicts a cross-sectional side view of the shelving unit and a person reaching through a light curtain and toward one of the items on the shelving unit according to one or more embodiments shown and described herein.
Figure 3:
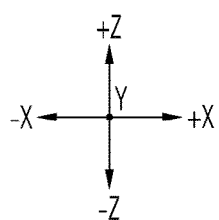
FIG. 3 schematically depicts a cross-sectional top view of the shelving unit and the person reaching through the light curtain and toward one of the items on the shelving unit according to one or more embodiments shown and described herein.
Figure 3:
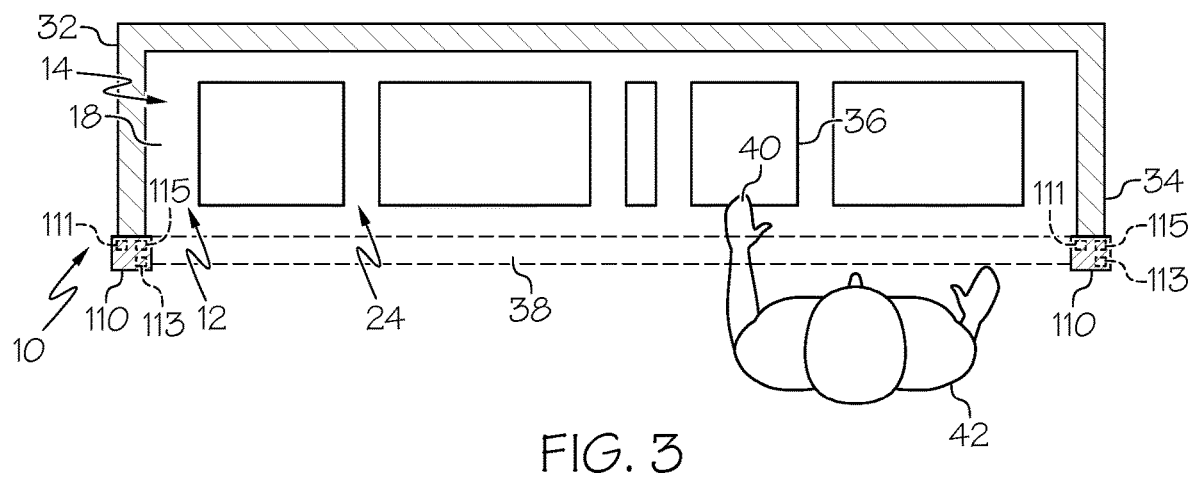

Referring now to FIGS. 1-3, a shelving unit 10 is shown having a height extending along the Y-axis and a length extending along the X-axis. The shelving unit 10 includes a top wall 28, a bottom wall 30, and a pair of side walls 32, 34. The shelving unit 10 has an interior 12 defined by the top wall 28, the bottom wall 30, and the pair of side walls 32, 34. A plurality of shelves 14 are provided within the interior 12 of the shelving unit 10 and extend between the pair of side walls 32, 34. Each shelf 16, 18, 20 has a length extending along the X-axis. As shown in FIGS. 1 and 2 for example, three shelves 14, particularly, an upper shelf 16, a middle shelf 18, and a lower shelf 20 are provided, which define an upper shelving area 22, a middle shelving area 24, and a lower shelving area 26, respectively. In embodiments, the lower shelf 20 is defined by the bottom wall 30. The upper shelving area 22 is defined by the top wall 28, the upper shelf 16, and the pair of side walls 32, 34. The middle shelving area 24 is defined by the upper shelf 16, the middle shelf 18, and the pair of side walls 32, 34. The lower shelving area 26 is defined by the middle shelf 18, the lower shelf 20, and the pair of side walls 32, 34. As shown, a plurality of items 36 are provided within the interior 12 of the shelving unit 10 and on each shelf 16, 18, 20. However, it is to be understood that, in some embodiments, the items 36 may be provided on any other suitable surface without the need for the shelving unit 10. For example, the items 36 may be hung (e.g., via hangars or the like) on one or more horizontally mounted poles (e.g., poles that extend between the first side wall 32 and the second side wall 34). Accordingly, the shelves shown and described herein are merely illustrative and the present disclosure is not limited to such.

As shown in FIG. 1, a plurality of laser devices 110 are provided and mounted near a front of the shelving unit 10. As shown, in embodiments, the laser devices 110 are spaced apart from one another and mounted to each of the top wall 28, the bottom wall 30, and the pair of side walls 32, 34. The locations of the laser devices 110 illustrated in the figures are not meant to be limiting and any other suitable location for the laser devices 110 is within the scope of the present disclosure. In some embodiments, each laser device 110 is mounted to a corner of the shelving unit 10. As referred to herein, a corner of the shelving unit 10 is defined by one of the top wall 28 and the bottom wall 30 contacting one of the pair of side walls 32, 34. When a laser device 110 is positioned at a corner of the shelving unit 10, the laser device 110 may be angled to be directed toward an opposite corner, such as a corner located at the other of the pair of side walls 32, 34 and/or the other of the top wall 28 and the bottom wall 30. In other embodiments, the laser device 110 may be positioned along one of the side walls 32, 34 and angled in a direction parallel to an adjacent one of the shelves 14. Here, a laser device 110 may be positioned within each of the upper shelving area 22, the middle shelving area 24, and the lower shelving area 26 to project separate light curtains 38 across each of the shelving areas 22, 24, 26. In other embodiments, the laser devices 110 are spaced apart from the shelving unit 10 and mounted separate from the shelving unit 10. It should be appreciated that a single laser device 110 may be suitable for purposes discussed herein. Throughout the ensuing description, reference will be made to a single laser device 110. However, it is to be understood that the disclosure of one laser device 110 is equally applicable to each of the laser devices 110. It should be appreciated that the number of laser devices 110 used may be determined based on the dimensions of the shelving unit 10. For example, a shelving unit having a greater number of shelves 14, and thus a greater height, and/or a greater width may employ additional laser devices 110 to project one or more light curtains 38 across the entire shelving unit 10.

The laser device 110 is any suitable device for projecting one or more light curtains 38 and determining an interference point of an object 40 crossing the light curtain 38, as shown in FIGS. 2 and 3. In some embodiments, the laser device 110 is a laser distance meter, or more particularly, a time-of flight sensor including a light source that produces and projects a plurality of beams of light to form the light curtain 38. Time-of-flight sensors operate by sending a pulse of laser light and measuring the time it takes for the reflection of the pulse of laser light to return to the time-of-flight sensor. Accordingly, when a reduction in time is determined for detecting the returning light, it is determined that an object has crossed the laser beam projected by the time-of-flight sensor. Although additional structure of devices for projecting a light curtain is referred to herein with reference to the laser devices 110, it should be appreciated that the described structure and functionality is equally applicable to the structure and functionality of a time-of-flight sensor for performing detecting a location of an object crossing the light curtain. The laser device 110 may generally be a laser emitting device, and is not limited by this disclosure. For example, the laser device 110 may be a semiconductor laser, such as a GaAs or a GaAlAs laser. Other laser devices should generally be understood. The laser device 110 may emit and detect wavelengths of light within the near infrared spectrum (e.g., wavelengths of light typically emitted by a near infrared laser). In some embodiments, separate components may be used for the emitting and detecting without departing from the scope of the present disclosure.

In embodiments, the time-of-flight sensors described herein utilize laser triangulation to determine a distance of an object from the time-of-flight sensor. Specifically, the time-of-flight sensor includes a laser emitter, such as light emitter 113 of the laser device 110, which projects a laser beam that is reflected from a target surface such as, for example, the object 40, and received at a collection lens, such as collection lens 115 of the laser device 110, of the time-of-flight sensor positioned adjacent the laser emitter. Here, the time-of-flight sensor includes a linear array detection device that measures an angle at which the reflected laser beam is received at the collection lens. More particularly, the linear array detection device identifies a measurement range from an angle such as, for example, 45 degrees to 65 degrees, from a center of the measurement range. As the linear array detection device processes the light of the received laser beam, longer exposure times allow for greater sensitivity and more accurate detections of weak reflections of the reflected laser beam. The longer exposure times may permit more accurate detection of laser beams being reflected off of a surface of an object, e.g., the object 40 crossing the light curtain 38 toward an item 36. Accordingly, it should be appreciated that the laser device 110, e.g., the time-of-flight sensor, described herein accomplishes more than conventional break-beam sensors which merely identifies a break in a laser beam path without identifying a shape, size, and/or location of the object that causes the break in the laser beam path or without using some other device, such as a camera or the like, to separately determine a shape, size, and/or location of the object. Rather, the laser device 110 may be used to collect data that can be processed to determine a shape and size of the object 40, as described in more detail herein. Based on the angle at which the reflected laser beam is received at the collection lens, the distance of the object 40 from the time-of-flight sensor may be determined either at the time-of-flight sensor itself or by transmitting a signal to a controller 104 (FIG. 4) to process the collected data and determine the distance.

In some embodiments, the laser device 110 may have a mirror 111 for reflecting the beams of light. When provided, the mirror 111 of the laser device 110 may have a plurality of facets. In a non-limiting example, the mirror 111 may be a four faceted rotating mirror 111. Each facet of the four faceted rotating mirror 111 is arranged at an angle with respect to the laser device 110 that is different from the angle of the other facets. In addition, the mirror 111 may be movable. In a non-limiting example, the mirror 111 may rotate about a center axis. As a result of the rotation, the mirror 111 reflects the beams of light in the form of four distinct light curtains 38. In other embodiments, a plurality of laser devices 110 may be utilized, each providing an associated light curtain 38, thereby eliminating the need for the laser device 110 to include a mirror.

For example, the mirror 111 may be a microelectromechanical mirror, also referred to herein as a micromirror. The micromirror may generally be any microelectromechanical device or portion thereof that is configured to alter a direction, change a focus, and/or redistribute electromagnetic radiation, including, but not limited to, visible light. The microelectromechanical mirror is utilized to redirect light received at the laser device 110 by controlling the angular orientation of the microelectromechanical mirror about an axis of rotation. In some embodiments, the angular orientation of the microelectromechanical mirror may be programmed into one or more memory modules 108 (FIG. 4) such that the microelectromechanical mirror may be instructed to move to the particular angular orientation to ensure the microelectromechanical mirror directs the light in accordance with a particular angular orientation.

In some embodiments, the laser device 110 may utilize solid state LiDAR instead of the mirror 111. In this embodiment, the optical emitters send bursts of photons in predetermined patters and phases to create directional emissions. The focus and size of these emissions may be adjusted as necessary based on the size and positioning of the light curtain 38. Specifically, the focus and size of the emissions is dependent on the size of the shelving unit 10, for example, how many shelves 14 are provided and the size of each of the shelves 14, so that accurate readings may be determined across the entire shelving unit 10. This eliminates any physical adjustment of a mirror, which makes the laser device 110 more compact and better able to withstand vibrations. The laser device 110 using solid state LiDAR is capable of emitting a plurality of light curtains 38 adjacent one another or overlapping one another to form a larger light curtain 38.

As described herein, the size and/or shape of each of the light curtains 38 projected by the laser devices 110 is adjustable. In a non-limiting example, the beams of light that are projected to form the light curtain 38 may be adjusted for size, sensitivity, and/or the like, by reducing an intensity of power output generating the beams. In another non-limiting example, the angle of each of the plurality of facets, when provided, may be adjusted with respect to the laser device 110 by operating any suitable motor or actuator (not shown) coupled to the mirror 111. This may be suitable for redirecting the reflected laser beam, for example, to control a shape and/or size of the light curtain 38. In yet another non-limiting example, the rotational speed of the mirror 111, when provided, may be adjusted (e.g., increased or decreased) by increasing power to the motor or actuator described herein. As such, the light curtains 38 may be particularly configured for a certain application (i.e., a size and/or shape of an area in which a plurality of items are positioned). For example, the intensity of the laser beams projected by the laser devices 110 to create the light curtain 38, as well as the direction of the laser beams being determined by an angle at which the laser devices 110 are mounted and/or operation of the mirrors 111 control a shape and/or size of the light curtain 38. Despite only a single light curtain 38 being illustrated in the figures, it is to be understood that the present disclosure may include a plurality of light curtains 38 projected by a plurality of laser devices 110 to form a unitary light curtain provided across the shelving unit 10. It should be understood that in some embodiments, the laser device 110 may be supplemented with an imaging device, such as a camera, for further identifying or confirming which of the items 36 is selected. In a non-limiting example, the laser device 110, for example, a time-of-flight sensor, detects an interference point at which the object 40 crosses the light curtain 38 and, subsequently, a location of the object 40 based on the detected interference point may be matched to an item 36. However, it should be appreciated that the imaging device is not required as the laser device 110 itself detects the interference point at which the object 40 crosses the light curtain 38 in the manner discussed herein without the use of any supplemental imaging devices. Additionally, in some embodiments, the laser device 110 may be supplemented with radar, ultrasonic, or IR based technology without departing from the scope of the present disclosure. This may be useful in instances in which a location of the object 40 crossing the light curtain 38 is to be verified. Additionally, it may be useful in situations to identify specific characteristics of the object 40 other than shape and size.

As shown in FIGS. 2 and 3, a single light curtain 38 formed by a plurality of beams of light is illustrated. However, it is understood that the light curtain 38 may include individual light curtains adjacent or opposite one another to form the light curtain 38. The laser device 110 projects the light curtain 38 at or near a front of the shelving unit 10 and at or near a front of each of the shelving areas 22, 24, 26. The laser device 110 has a wide angle view such that the light curtain 38 may be provided over the entire area in front of the shelving unit 10, particularly an area in front of the upper shelving area 22, the middle shelving area 24, and the lower shelving area 26. The light curtain 38 referred to herein should be understood as defining a plane extending in front of the shelving unit 10 with the items 36 positioned behind the light curtain 38 and within the interior 12 of the shelving unit 10. The plane in which the light curtain 38 extends may be parallel to an X-Y plane depicted by the coordinate axes in the figures.

The light curtain 38 has a length extending along the X-axis and a height extending along the Y-axis. In some embodiments, the light curtain 38 provided by the laser device 110 has a length and a height at least as large as the length and the height of the shelving unit 10 to extend across each of the shelving areas 22, 24, 26. In other embodiments, the laser device 110 may provide the light curtain 38 with a length and a height less than the length and the height of the shelving unit 10 to extend across only a portion of the shelving areas 22, 24, 26 where the items 36 may be provided. Further, in other embodiments, a plurality of laser devices 110 may be provided, as shown, such that each laser device 110 provides a light curtain 38 adjacent one another, opposite one another, or overlapping one another to form a light curtain 38 larger than one provided by utilizing only a single laser device 110.

The laser device 110 is capable of identifying a time at which an object 40 crosses the light curtain 38 and an interference point of the object 40 crossing the light curtain 38. For example, as shown in FIGS. 2 and 3, the laser device 110 provides the light curtain 38 in front of the shelving unit 10 and adjacent to each of the shelving areas 22, 24, 26. In a non-limiting example, the object 40, such as a hand of a person 42, reaches through the light curtain 38 along the Z-axis toward an item 36 on the middle shelf 18. In another non-limiting example, the object 40 may be an end effector of a robotic arm or some other suitable picking tool. Thus, it should be understood that the present disclosure is suitable for use in instances including automatic picking or selecting of objects. However, as discussed herein, without limiting the scope of the present disclosure, reference to the object 40 selecting the item 36 is a hand of a person 42.

The laser device 110 is capable of identifying when the object 40 (e.g., a hand of a person 42) crosses the light curtain 38 along the Z-axis by detecting a reduction in the amount of time it takes for the laser beam to be reflected back to the light curtain 38. More particularly, in response to the laser device 110 detecting that the object 40 crosses the light curtain 38, the laser device 110 may transmit a signal to a controller 104 (FIG. 4) to determine one or more X coordinates and one or more Y coordinates where the light curtain 38 has been broken by the object 40 by measuring a distance between the object 40 and the laser device 110, as described in more detail herein. Thus, the laser device 110 disclosed herein determines that the object 40 has crossed the light curtain 38 when the distance measured by the laser device 110 across the shelving unit 10 is reduced to indicate the object 40 is interfering with the path of the beams of light forming the light curtain 38. Thereafter, a location of the object 40 is determined along an X-Y plane based on which portion of the light curtain 38 detects the change in distance by the interfering object 40. Based on the location of the beams of light contacting the object 40 and the distance of the object 40 determined, the object 40 may be assigned one or more X coordinates and one or more Y coordinates indicating the location of the object 40 on the light curtain 38.

Throughout the ensuing description, reference may be made to the location of the object 40 and the location of the item 36 including both an X coordinate and a Y coordinate. However, the location of the object 40 and the location of the item 36 may include either an X coordinate or a Y coordinate when it is only necessary to identify a vertical location, for example, a shelf 14, or a horizontal location at which the object 40 crosses the light curtain 38. In some embodiments, only an X coordinate or a Y coordinate may be necessary for determining the item 36 selected. In a non-limiting example, each shelf 16, 18, 20 may be provided with a plurality of identical items 36 and each shelf 16, 18, 20 is assigned a Y coordinate or a range of Y coordinates. Thus, when determining only the Y coordinate of the location of the object 40, it may possible to determine which of the shelves 16, 18, 20 and which item 36 the object 40 is reaching toward, thereby eliminating the need to determine the X coordinate. Similarly, although not shown, identical items 36 may be arranged in columns on the shelving unit 10 extending in the Y-axis. In this embodiment, each column may be assigned an X coordinate or a range of X coordinates. Thus, when determining only the X of the location of the object 40, it may possible to determine which column and which item 36 the object 40 is reaching toward, thereby eliminating the need to determine the Y coordinate.

It should be appreciated that the location of each of the items 36 may include a single X coordinate and a single Y coordinate to indicate a singular point at which the object 40 crosses the light curtain 38. A single X coordinate and a single Y coordinate indicates a dot without any data regarding shape and size. However, in some embodiments, the location of each of the items 36 may include a range of X coordinates and a range of Y coordinates to indicate a size of each item 36.

In some embodiments, the laser device 110 is capable of determining the shape and/or size of the object 40 that crosses the light curtain 38. More specifically, the laser device 110 identifies at least one of a range of X coordinates and a range of Y coordinates defining horizontal and vertical bounds of the object 40 instead of a single X coordinate and a single Y coordinate. The range of X coordinates and the range of Y coordinates is determined based on the distance between the beams of light forming the light curtain 38 that detect a change in the distance from the laser device 110 to the object 40. Thus, when the laser device 110 detects that the object 40 crosses the light curtain 38, distance readings are provided by each beam of light based on the time it takes for the light to reflect back to the laser device 110 to determine which beams of light identified a change (i.e., reduction) in the distance from the laser device 110. More particularly, the time in which it takes for the laser beam to return to the laser device 110, in addition to the angle at which the laser beam returns to the laser device 110, based on a known vertical and/or horizontal location of the laser device 110, is utilized to determine the X coordinate and the Y coordinate of the object 40. In embodiments, the time in which it takes for the laser beam to return to the laser device 110 is compared to a baseline time value prior at which no object crosses the light curtain 38. The baseline time value may be the time it takes for the laser beam to reflect from an opposite one of the side walls 32, 34 or an opposite one of the top wall 28 and bottom wall 30 of the shelving unit 10. Alternatively, the baseline time value may not be present in instances in which no laser beam is reflected back to the laser device 110, such as when the laser beams emitted by the laser device 110 dissipate prior to contacting a reflecting surface. The baseline time value may be determined by performing an initial calibration of the laser device to identify what structure interacts with the light curtain 38, if any. The laser device 110 then processes these distance readings to determine the location as well as shape and/or size of the object 40. In embodiments, the laser device 110 may access a database including data, for example, shapes and/or size data pertaining to various objects, to determine the item 36 with which the object 40 interacted. It should be appreciated that while a single laser device 110 may be utilized, the location readings of the object 40 may be more accurate when utilizing one or more additional laser devices 110 positioned adjacent and/or opposite the laser device 110 to capture distance information from both sides of the object 40. For example, in some instances, a first object crossing the light curtain 38 at an upper left corner of the shelving unit 10 proximate a first laser device 110 may obstruct the view of a second object crossing the light curtain 38 at a lower right corner of the shelving unit 10. However, an oppositely positioned laser device 110 would be capable of identifying an interference point of the second object without its view being obstructed by the first object. Thus, providing a plurality of laser devices 110, as shown in FIG. 1, may be better suited for identifying interference points of multiple objects simultaneously crossing the light curtain 38.

The range of X coordinates corresponds to the width of the object 40 and the range of Y coordinates corresponds to the height of the object 40. Although it can be appreciated that the object 40 may rotate upon entering and exiting the light curtain 38, the width (range of X coordinates) and height (range of Y coordinates) may be used to determine a total size of the object 40. In some embodiments, the size of the object 40 may be determined by at least one of the width and the height of the object 40. In other embodiments, the size of the object 40 may be determined by a combination of the width and the height of the object 40 to take into account rotation of the object 40 when crossing the light curtain 38. The laser device 110 determines the size of the object 40 both upon entering the light curtain 38 and upon exiting the light curtain 38. As discussed in more detail below, comparing the size of the object 40 when entering the light curtain 38 to the size of the object 40 when exiting the light curtain 38 may indicate if an item 36 was removed from or placed on the shelving unit 10.

The laser device 110 determines information regarding the location of the object 40, the specific item 36 the object 40 reached for, a first size of the object 40 when entering the light curtain 38, a second size of the object 40 when exiting the light curtain 38, as well as a first time at which the object 40 enters the light curtain 38 and a second time at which the object 40 exits the light curtain 38. Information regarding the time of the object 40 entering and exiting the light curtain 38 is relevant for determining how long the object 40 was extending through the light curtain 38 and, thus, how long the person 42 may have been holding the object 40 while on the shelving unit 10. In addition, the time information may be useful in determining how long the person 42 held the object 40 outside of the shelving unit 10 prior to placing it back on the shelving unit 10. For example, the laser device 110 may identify, as discussed herein, that the item 36 was removed from the shelving unit 10 at a first time and replaced on the shelving unit 10 at a second time. The laser device 110 can determine that the removed item 36 is the same item 36 originally on the shelving unit 10 when the second size of the object 40 as it exits the light curtain 38 is the same as or substantially similar to the first size of the object 40 as it enters the light curtain 38 and at the same or substantially similar location. This information is useful in fields such as, for example, a retail environment, to gather data with regard to how often specific items are removed from a shelf, but not purchased. When referring to the first size and the second size of the object 40, it is understood that the size of the object 40 will increase when an item 36 is being removed from or placed on the shelving unit 10 as the hand of the person 42 is holding the item 36. Thus, reference to the size of the object 40 also takes into consideration the size of the item 36 the object 40 is holding. Moreover, it should be appreciated that the object 40 may include both hands of a person 42 when handling a larger item 36.

Figure 4:
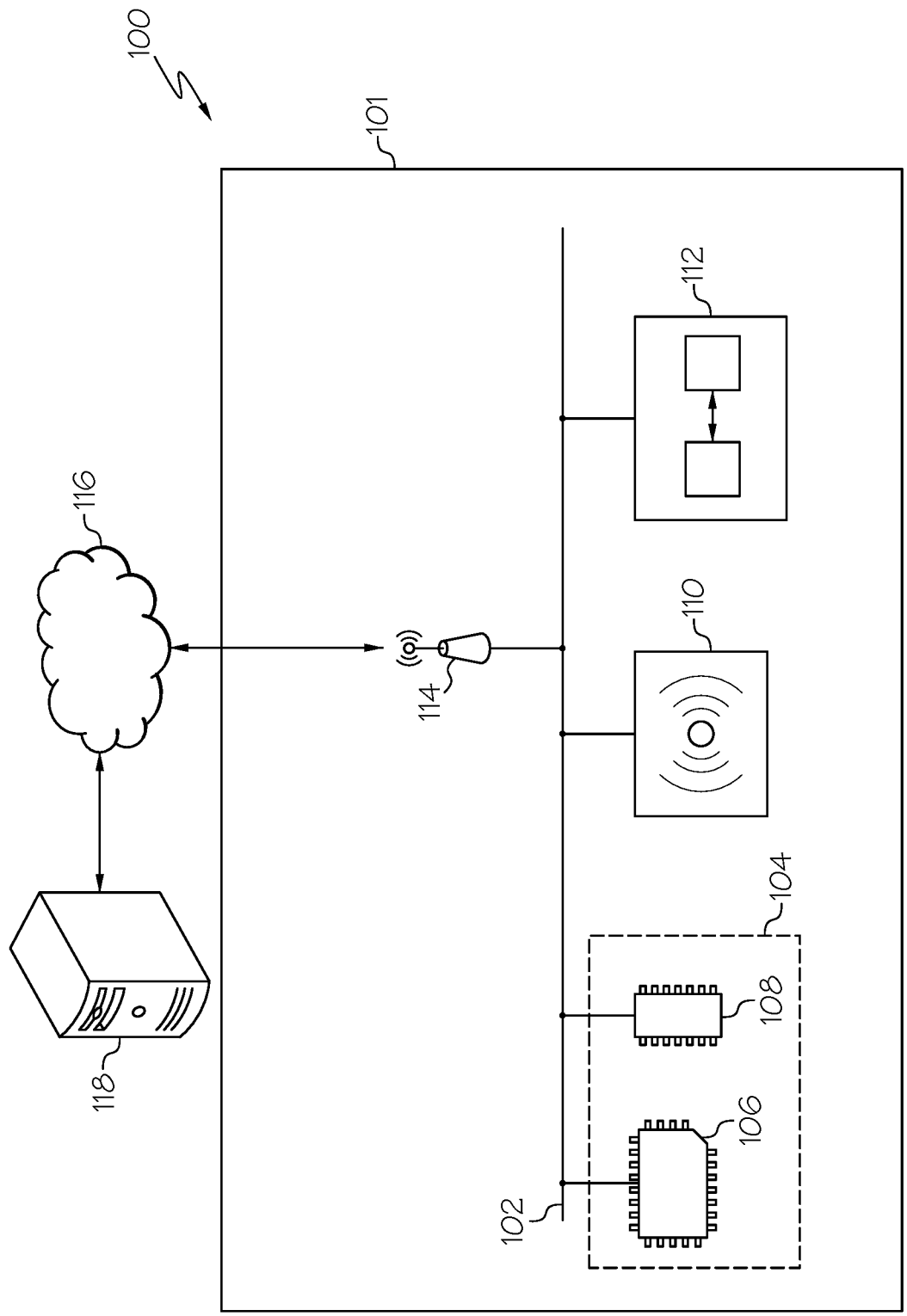
FIG. 4 schematically depicts components of an illustrative system for determining a shape and/or size of an object that breaks a light curtain projected adjacent to a shelving unit according to one or more embodiments shown and described herein.

FIG. 4 schematically depicts components of a system 100 for determining a location of an object breaking a light curtain corresponding to an item of a plurality of items behind the light curtain. The system 100 includes a monitoring device 101 including a communication path 102, a controller 104 having a processor 106 and a non-transitory, processor-readable memory 108, at least one of the laser devices 110, an item identification module 112, and network interface hardware 114. The network interface hardware 114 may communicatively couple the monitoring device 101 to a server 118 via a network 116. The various components of the system 100 and the interaction thereof will be described in detail below.

Referring to the system 100, the communication path 102 may be formed from any medium that is capable of transmitting a signal such as, for example, conductive wires, conductive traces, optical waveguides, or the like. The communication path 102 may also refer to the expanse in which electromagnetic radiation and their corresponding electromagnetic waves traverses. Moreover, the communication path 102 may be formed from a combination of mediums capable of transmitting signals. In one embodiment, the communication path 102 includes a combination of conductive traces, conductive wires, connectors, and buses that cooperate to permit the transmission of electrical data signals to components such as processors, memories, sensors, input devices, output devices, and communication devices. Accordingly, the communication path 102 may include a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 102 communicatively couples the various components of the system 100. As used herein, the term "communicatively coupled" means that coupled components are capable of exchanging signals with one another such as, for example, electrical signals via conductive medium, electromagnetic signals via air, optical signals via optical waveguides, and the like.

The controller 104 may be any device or combination of components comprising the processor 106 and the non-transitory, processor-readable memory 108. The processor 106 of the system 100 may be any device capable of executing the machine-readable instruction set stored in the non-transitory, processor-readable memory 108. Accordingly, the processor 106 may be an electric controller, an integrated circuit, a microchip, a computer, or any other computing device. The processor 106 is communicatively coupled to the other components of the monitoring device 101 by the communication path 102. Accordingly, the communication path 102 may communicatively couple any number of processors with one another, and allow the components coupled to the communication path 102 to operate in a distributed computing environment. Specifically, each of the components may operate as a node that may send and/or receive data. While the embodiment depicted in FIG. 4 includes a single processor, other embodiments may include more than one processor.

The non-transitory, processor-readable memory 108 of the system 100 is coupled to the communication path 102 and communicatively coupled to the processor 106. The non-transitory, processor-readable memory 108 may include RAM, ROM, flash memories, hard drives, or any non-transitory memory device capable of storing machine-readable instructions such that the machine-readable instructions can be accessed and executed by the processor 106. The machine-readable instruction set may include logic or algorithm(s) written in any programming language of any generation (e.g., 1GL, 2GL, 3GL, 4GL, or 5GL) such as, for example, machine language that may be directly executed by the processor 106, or assembly language, object-oriented programming (OOP), scripting languages, microcode, etc., that may be compiled or assembled into machine readable instructions and stored in the non-transitory, processor-readable memory 108. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 4 includes a single non-transitory, processor-readable memory 108, other embodiments may include more than one memory module. In some embodiments, the non-transitory, processor-readable memory 108 includes a database including a listing of items and corresponding position or location information for each item.

The laser device 110, which is discussed in detail herein, is coupled to the communication path 102. Upon determining the location of the object 40 crossing the light curtain 38, the laser device 110 transmits the location information to the item identification module 112 to identify the corresponding item 36.

The item identification module 112 is coupled to the communication path 102. As described herein, the term "module" may refer to, be part of, or include: an Application Specific Integrated Circuit (ASIC); a digital, analog, or mixed analog/digital discrete or integrated circuit; a combinational logic circuit; a field programmable gate array (FPGA); a processor circuit that executes machine-readable instructions; a memory circuit that stores machine-readable instructions executed by the processor circuit; other suitable hardware components that provide the described functionality; or a combination of some or all of the above. The item identification module 112 receives data from the laser device 110 and data relating to the items from the non-transitory, processor-readable memory 108, or the server 118 as discussed below, to determine which item an object, such as the object 40, extends toward. More particularly, the item identification module 112, or in some embodiments the laser device 110 itself, may determine one or more aspects of the detected object, such as size, shape, orientation, etc.

Still referring to FIG. 4, the system 100 includes the network interface hardware 114 coupled to the communication path 102. The network interface hardware 114 may be any device capable of transmitting and/or receiving data via the network 116. Accordingly, network interface hardware 114 can include a communication transceiver for sending and/or receiving any wired or wireless communication. For example, the network interface hardware 114 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 114 includes hardware that operates in accordance with the Bluetooth wireless communication protocol. In another embodiment, the network interface hardware 114 may include a Bluetooth send/receive module for sending and receiving Bluetooth communications to/from the network 116. The network interface hardware 114 may also include a radio frequency identification ("RFID") reader that interrogates and reads RFID tags.

The monitoring device 101 is communicatively coupled to the server 118 via the network 116. In some embodiments, the network 116 is a personal area network that utilizes the network 116 may include one or more computer networks (e.g., a personal area network, a local area network, or a wide area network), cellular networks, satellite networks and/or a global positioning system and combinations thereof. Accordingly, the monitoring device 101 can be communicatively coupled to the network 116 via wires, via a wide area network, via a local area network, via a personal area network, via a cellular network, via a satellite network, or the like. Suitable local area networks may include wired Ethernet and/or wireless technologies such as, for example, Wi-Fi. Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. In some embodiments, the database including the listing of items and corresponding position information is stored in the server 118.

As described in more detail herein, the location of the object 40 is transmitted to the item identification module 112, which compares the location of the object 40 to an associated location of each of the items 36 stored in the non-transitory, processor-readable memory 108 of the monitoring device 101 or in the database of the server 118. When the locations of the items 36 are stored in the server 118, the item identification module 112 receives the location of each item via the network 116 by way of the network interface hardware 114. The item identification module 112 matches the location of the object 40 to the associated location of an item 36 to identify which item 36 the object 40 extended toward. Upon instruction from the monitoring device 101, information pertaining to the items 36 may be sent from the server 118 to the item identification module 112.

Figure 5:
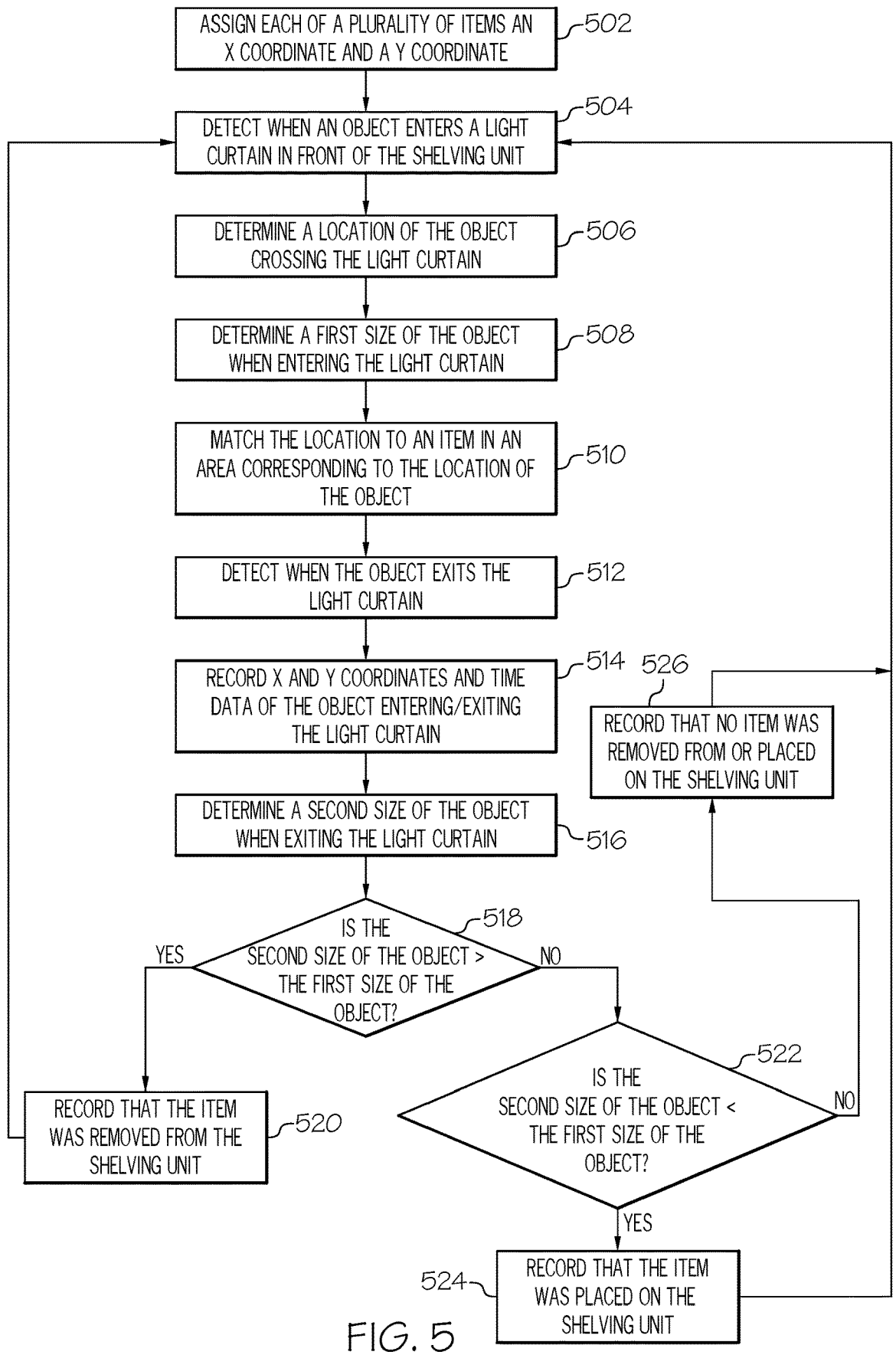
FIG. 5 depicts a flow diagram of an illustrative method for identifying a manner in which an item is handled according to one or more embodiments shown and described herein.

Referring now to FIG. 5, a method is shown for identifying an item removed from a shelving unit using the system 100 illustrated in FIG. 4 and with reference to the shelving unit 10 illustrated in FIGS. 1-3.

Referring to FIGS. 2 and 5, at step 502, each item 36 is assigned a location including at least one of an X coordinate and a Y coordinate relative to the shelving unit 10. The Y coordinate indicates where along the height of the shelving unit 10 the item is placed. Thus, the Y coordinate indicates on which shelf 16, 18, 20 the item 36 is placed. The X coordinate indicates where the item 36 is located along the length of the shelving unit 10 and the shelf 16, 18, 20. In some embodiments, the location of each item 36 may be manually entered. In some embodiments, the location may be inputted for each item 36 using a handheld scanning device. The location of each item 36 may be stored as a look up table locally in the non-transitory, processor-readable memory 108 or in the database of the server 118.

At step 504, the laser device 110, for example, a time-of-flight sensor, detects when the object 40 enters the light curtain 38 in front of the shelving unit 10 and in front of the items 36. It should be appreciated, that the time-of-flight sensor is particularly configured to detect an interference point of the object 40 with the light curtain 38 and detecting position data of the interference point so that a corresponding location of the object 40 and item matching may be performed. As discussed herein, when the laser device 110 detects an interference point in the beams of light forming the light curtain 38, it is determined that the object 40 crossed the light curtain 38 along the Z-axis. Specifically, when the laser device 110 identifies a reduction in the time of the light being reflected back to the laser device 110, the laser device 110 identifies that the object 40 has crossed the light curtain 38. A time at which the object 40 enters the light curtain 38 is stored as a first time.

At step 506, upon determining that the object 40 entered the light curtain 38, the laser device 110 itself determines the interference point of the object 40 crossing the light curtain 38, in the manner discussed herein. Specifically, the laser device 110 emits a laser beam which is reflected by a surface of the object 40 crossing the light curtain 38. The reflected laser beam is directed back toward the laser device 110, such as a collection lens, which measures an elapsed time between emitting the laser beam and receiving the reflected laser beam. In embodiments, the laser device 110 may include a linear array detection device for measuring a triangulated angle at which the reflected laser beam is received at the collection lens. The angle at which the reflected laser beam is received alone or in combination with the time elapsed during emission of the laser beam and receiving the reflected laser beam is processed, either at the laser device 110 itself or at a controller that receives a signal from the laser device 110, to determine the distance between the interference point and the laser device 110. The distance data collected by the laser device 110 based on the interference point is then utilized to identify the location of the object 40 which includes at least one of an X coordinate and a Y coordinate, and in some embodiments at least one of a range of X coordinates and a range of Y coordinates.

At step 508, a first size of the object 40 is determined. As discussed herein, the laser device 110 is capable of identifying a first size of the object 40 entering the light curtain 38 at the first time by identifying at least one of a range of X coordinates and a range of Y coordinates defining horizontal and vertical bounds of the object 40. As noted above, the range of X coordinates and the range of Y coordinates is determined based on which beams of light detect a change in the distance from the laser device 110 when the object 40 crosses the light curtain 38. The first size of the object 40 may be determined by at least one of the range of the X coordinates or a range of the Y coordinates identifying the width and the height of the object 40, respectively. In other embodiments, the first size of the object 40 may be determined by combining the ranges to determine an area of the object 40.

At step 510, the detected location of the object 40 is matched to an item 36 in an area corresponding to the location of the object 40. As discussed herein, each item 36 is assigned a location including at least one of an X coordinate and a Y coordinate. The item identification module 112 receives the location of the object 40 as well as the location of each item 36 from the non-transitory, processor-readable memory 108 or the server 118 (FIG. 4). The location of the object 40 is then matched or compared to the locations of the items 36. Accordingly, the monitoring device 101 is capable of identifying which item 36 the object 40 is extended toward by identifying which item 36 has a location nearest or most similar to the detected location of the object 40.

At step 512, the laser device 110 detects when the object 40 exits the light curtain 38. Similar to step 504, the laser device 110 detects when the object 40 exits the light curtain 38 by determining when the interruption in the light curtain 38 caused by the object 40 is no longer present. More particularly, the laser device 110 determines that the object 40 is no longer present when the distance readings for each beam of light of the light curtain 38 from the laser device 110 returns to its original distance, which is greater than the distance when the object 40 is present. Similarly, it is determined that the object 40 no longer interferes with the light curtain 38 when the laser device 110 identifies the time at which the light is reflected back to the laser device 110 returns to the original time prior to the object 40 being present. A time at which the object 40 exits the light curtain 38 is stored as a second time.

At step 514, information pertaining to the location of the object 40 entering and exiting the light curtain 38, as well as time information of the object 40 entering and exiting the light curtain 38 is recorded. It should be understood that the recording of the location and time information of the object 40 crossing the light curtain 38 may occur in real time or may be delayed due to processing by the monitoring device 101.

At step 516, a second size of the object 40 is determined. As discussed herein, the laser device 110 is capable of identifying the second size of the object 40 exiting the light curtain 38 at the second time in a manner similar to which the first size of the object 40 is determined at step 508.

At step 518, the second size of the object 40 is compared to the first size of the object 40 to determine whether the size of the object 40 changed upon exiting the light curtain 38. The comparing of the first size and the second size of the object 40 may be performed by any suitable component of the system 100, such as the processor 106, the laser device 110, or the item identification module 112. If the second size of the object 40 is determined to be greater than the first size of the object 40, it is recorded at step 520 that the item 36 was removed from the shelving unit 10.

If the second size of the object 40 is not determined to be greater than the first size of the object 40 at step 518, then it is determined at step 522 whether the second size of the object 40 is less than the first size of the object 40. If so, it is recorded at step 524 that the item 36 was placed on the shelving unit 10.

Alternatively, if it is determined that the second size of the object 40 is neither greater than nor less than the first size of the object 40 at step 518 and step 522, respectively, (i.e., the second size of the object 40 is substantially equal to the first size of the object 40) then, at step 526, it is recorded that no item was removed from or placed on the shelving unit 10. This is indicative of a person handling an object, but not removing the object from the shelving unit 10. It should be appreciated that the recorded information pertaining to whether the item 36 was removed from or placed on the shelving unit 10 may be stored locally in the monitoring device 101 or in the server 118 (FIG. 4).

From the above, it is to be appreciated that defined herein is a new and unique laser detection system for identifying user interaction with an item. More particularly, the laser detection system includes one or more laser devices for projecting a light curtain across a plurality of items situated on a shelving unit. The one or more laser devices identify a manner in which a on object, i.e., a hand of a person, interacts with one or more of the objects by detecting a change in size of on object upon entering the light curtain versus exiting the light curtain. Specifically, the one or more laser devices detect a location at which the object crosses the light curtain without input from any supplemental cameras or imaging devices.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A laser detection system comprising:
at least one laser device projecting a light curtain; and
a controller comprising:
 a processor; and
 non-transitory, processor-readable memory including executable instructions that, when executed by the processor, cause the controller to:
  receive a signal from the at least one laser device, the signal including an interference point of an object with the light curtain, and distance data indicating a distance between the interference point and the at least one laser device;
  determine a location at which the object enters the light curtain based on the distance between the interference point and the at least one laser device; and
  identify an item of a plurality of items located in an area behind the light curtain and corresponding to the location at which the object enters the light curtain.

2. The laser detection system of claim 1, wherein the at least one laser device comprises a time-of-flight sensor.

3. The laser detection system of claim 1, wherein the executable instructions, when executed by the processor, cause the controller to:
detect a first time at which the object enters the light curtain;
detect a second time at which the object exits the light curtain; and
record the first time and the second time.

4. The laser detection system of claim 1, wherein the location at which the object enters the light curtain includes at least one of an X coordinate and a Y coordinate.

5. The laser detection system of claim 1, wherein the executable instructions, when executed by the processor, cause the controller to:
determine a first size of the object when entering the light curtain; and
determine a second size of the object when exiting the light curtain.

6. The laser detection system of claim 5, wherein the executable instructions, when executed by the processor, cause the controller to:
determine the first size of the object and the second size of the object based on at least one of a range of X coordinates and a range of Y coordinates.

7. The laser detection system of claim 5, wherein the executable instructions, when executed by the processor, cause the controller to:
record that the item has been removed when the second size of the object is greater than the first size of the object.

8. The laser detection system of claim 7, wherein the executable instructions, when executed by the processor, cause the controller to:
record that the item has been replaced when the second size of the object is less than the first size of the object.

9. The laser detection system of claim 7, wherein the executable instructions, when executed by the processor, cause the controller to:
record that the item has not been removed when the second size of the object is equal to the first size of the object.

10. A shelving unit system comprising:
a shelving unit having an interior, a plurality of items provided in the interior of the shelving unit; and
a laser detection system comprising:
 at least one laser device projecting a light curtain adjacent to at least a portion of the interior of the shelving unit; and
 a controller comprising:
  a processor; and
  non-transitory, processor-readable memory including executable instructions that, when executed by the processor, cause the controller to:
   receive a signal from the at least one laser device, the signal including an interference point of an object with the light curtain, and distance data indicating a distance between the interference point and the at least one laser device;
   determine a location at which the object enters the light curtain based on the distance between the interference point and the at least one laser device; and
   identify an item of the plurality of items located in the interior of the shelving unit behind the light curtain and corresponding to the location at which the object enters the light curtain.

11. The shelving unit system of claim 10, wherein the at least one laser device comprises a time-of-flight sensor.

12. The shelving unit system of claim 10, wherein the location at which the object enters the light curtain includes at least one of an X coordinate and a Y coordinate.

13. The shelving unit system of claim 10, wherein the executable instructions, when executed by the processor, cause the controller to:
determine a first size of the object when entering the light curtain; and
determine a second size of the object when exiting the light curtain.

14. The shelving unit system of claim 13, wherein the executable instructions, when executed by the processor, cause the controller to:
determine the first size of the object and the second size of the object based on at least one of a range of X coordinates and a range of Y coordinates.

15. The shelving unit system of claim 13, wherein the executable instructions, when executed by the processor, cause the controller to:
record that the selected item has been removed from the shelving unit when the second size of the object is greater than the first size of the object.

16. The shelving unit system of claim 13, wherein the executable instructions, when executed by the processor, cause the controller to:
record that the selected item has been placed on the shelving unit when the second size of the object is less than the first size of the object.

17. The shelving unit system of claim 13, wherein the executable instructions, when executed by the processor, cause the controller to:
record that the selected item has not been removed from the shelving unit when the second size of the object is equal to the first size of the object.

18. A method of identifying user interaction with an item on a shelving unit, comprising:
projecting a light curtain adjacent by at least one laser device across at least a portion of a shelving unit;
receiving a signal from the at least one laser device, the signal including an interference point of an object with the light curtain, and distance data indicating a distance between the interference point and the at least one laser device;
determining a location at which the object enters the light curtain based on the distance between the interference point and the at least one laser device; and
identifying an item of a plurality of items located in an area behind the light curtain and corresponding to the location at which the object enters the light curtain.

19. The method of claim 18, further comprising:
determining a first size of the object when entering the light curtain; and
determining a second size of the object when exiting the light curtain.

20. The method of claim 19, further comprising:
recording that the item has been removed from the shelving unit when the second size of the object is greater than the first size of the object;
recording that the item has been placed on the shelving unit when the second size of the object is less than the first size of the object; and
recording that the item has not been removed from the shelving unit when the second size of the object is equal to the first size of the object.

* * * * *